US009600558B2

(12) United States Patent
Kesselman et al.

(10) Patent No.: US 9,600,558 B2
(45) Date of Patent: Mar. 21, 2017

(54) GROUPING OF OBJECTS IN A DISTRIBUTED STORAGE SYSTEM BASED ON JOURNALS AND PLACEMENT POLICIES

(71) Applicant: Google Inc., Mountain View, CA (US)

(72) Inventors: Alexander Kesselman, Sunnyvale, CA (US); Alexandre Drobychev, San Mateo, CA (US); George Datuashvili, Cupertino, CA (US)

(73) Assignee: GOOGLE INC., Mountain View, CA (US)

( * ) Notice: Subject to any disclaimer, the term of this patent is extended or adjusted under 35 U.S.C. 154(b) by 337 days.

(21) Appl. No.: 13/927,010

(22) Filed: Jun. 25, 2013

(65) Prior Publication Data
US 2014/0379715 A1 Dec. 25, 2014

(51) Int. Cl.
G06F 7/00 (2006.01)
G06F 17/30 (2006.01)
G06F 3/06 (2006.01)
H04L 29/08 (2006.01)

(52) U.S. Cl.
CPC ........ G06F 17/30598 (2013.01); G06F 3/067 (2013.01); G06F 17/30575 (2013.01); H04L 67/1095 (2013.01)

(58) Field of Classification Search
CPC ........... G06F 11/2094; G06F 17/30289; G06F 17/30575; G06F 17/3071; G06F 17/30864; G06F 17/30598; G06F 17/30705; G06F 17/30265
USPC ....................................................... 707/737
See application file for complete search history.

(56) References Cited

U.S. PATENT DOCUMENTS 7,085,789 B1 8/2006 Tarditi
7,574,699 B1 8/2009 Simmons et al.
7,778,972 B1 8/2010 Cormie et al.
7,856,437 B2 12/2010 Kirshenbaum
(Continued)

OTHER PUBLICATIONS

Corbett, Spanner, ACM Transactions on Computer Systems, vol. 31, No. 3, Sep. 21, 2012, pp. 1-22.
(Continued)

*Primary Examiner* — Robert Beausoliel, Jr.
*Assistant Examiner* — Michael Pham
(74) *Attorney, Agent, or Firm* — Morgan, Lewis & Bockius LLP

(57) ABSTRACT

Managing placement of object replicas is performed at a first instance of a distributed storage system. One or more journals are opened for storage of object chunks. Each journal is associated with a single placement policy. A first object is received comprising at least a first object chunk. The first object is associated with a first placement policy. The first object chunk is stored in a first journal whose associated placement policy matches the first placement policy. The first journal stores only object chunks for objects whose placement policies match the first placement policy. For the first journal, the receiving and storing operations are repeated for multiple objects whose associated placement policies match the first placement policy, until a first termination condition occurs. Then, the first journal is closed. Subsequently, the first journal is replicated to a second instance of the distributed storage system according to the first placement policy.

19 Claims, 11 Drawing Sheets

(56) References Cited

U.S. PATENT DOCUMENTS

| | | | |
|---|---|---|---|
| 8,010,514 B2 * | 8/2011 | Zhang et al. | 707/696 |
| 8,261,033 B1 * | 9/2012 | Slik | G06F 3/067 |
| | | | 711/111 |
| 8,301,671 B1 | 10/2012 | Greenwood et al. | |
| 8,341,118 B2 * | 12/2012 | Drobychev et al. | 707/636 |
| 8,346,820 B2 | 1/2013 | Kesselman et al. | |
| 8,463,787 B2 | 6/2013 | Kirshenbaum | |
| 8,504,571 B2 | 8/2013 | Howe et al. | |
| 8,775,485 B1 | 7/2014 | Cavage et al. | |
| 2006/0004868 A1 | 1/2006 | Claudatos et al. | |
| 2007/0143564 A1 | 6/2007 | Uppala | |
| 2010/0274762 A1 | 10/2010 | Murphy et al. | |
| 2010/0306171 A1 | 12/2010 | Antos et al. | |
| 2010/0325476 A1 | 12/2010 | Zhang et al. | |
| 2011/0035376 A1 | 2/2011 | Kirshenbaum | |
| 2011/0196831 A1 * | 8/2011 | Zunger et al. | 707/634 |
| 2011/0196833 A1 | 8/2011 | Drobychev et al. | |
| 2011/0196900 A1 | 8/2011 | Drobychev et al. | |
| 2012/0158672 A1 | 6/2012 | Oltean et al. | |
| 2012/0259863 A1 | 10/2012 | Bodwin et al. | |
| 2013/0124467 A1 | 5/2013 | Naidu et al. | |
| 2013/0124523 A1 | 5/2013 | Rogers et al. | |
| 2013/0339297 A1 | 12/2013 | Chen | |
| 2014/0095437 A1 | 4/2014 | Hwang et al. | |
| 2014/0201151 A1 | 7/2014 | Kumarasamy et al. | |
| 2014/0379715 A1 | 12/2014 | Kesselman et al. | |

OTHER PUBLICATIONS

Google Inc., International Search Report and Written Opinion, PCT/US2014/043721, Oct. 14, 2014, 13 pgs.

Taneja Group Technology Analysts, Technology in Brief, the Object Evolution, EMC Object-Based Storage for Active Archiving and Application Development, Nov. 30, 2012, 12 pgs.

Google Inc., International Search Report and Written Opinion, PCT/US2014/072356, Mar. 30, 2015, 10 pgs.

Nath, Evaluating the Usefulness of Content Addressable Storage for High-Performance Data Intensive Applications, 2008, 10 pgs.

Chun, Efficient Replica Maintenance for Distributed Storage Systems, USENIX Association, NSDI '06: 3rd Symposium on Networked Systems Design & Implementation, 2006, 14 pgs.

Zhan, Metadata Management for Distributed Multimedia Storage System, International Symposium on Electronic Commerce and Security, IEEE Computer Society, 2008, 5 pgs.

Google Inc., International Preliminary Report on Patentability, PCT/US2014/072356, Jul. 7, 2016, 7 pgs.

* cited by examiner

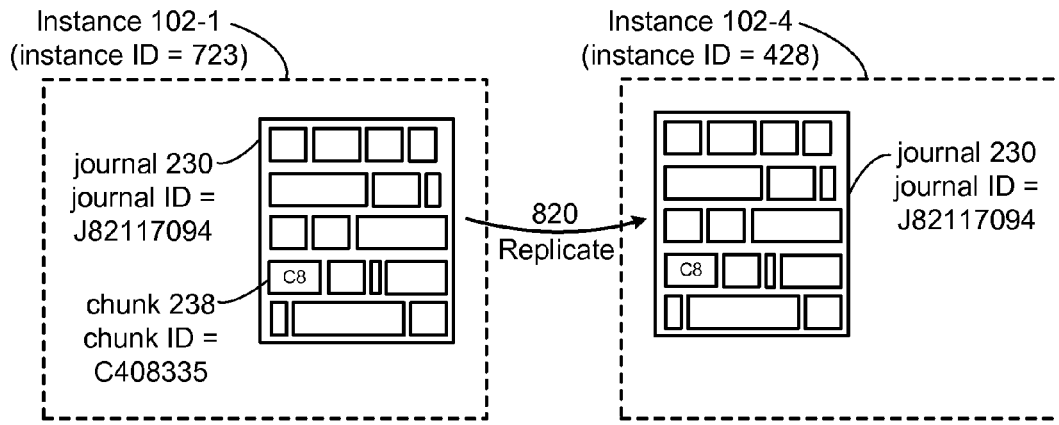

Before Replication of journal J82117094 from instance 102-1 to instance 102-4

Object Metadata 228

| object ID 330 | chunk ID 346 | journal ID 348 |
|---|---|---|
| 58440912 | C390917 | J82117094 |
| 58440912 | C408335 | J82117094 |
| 58440912 | C098663 | J77298045 |
| 72214320 | C390917 | J82117094 |
| 66805157 | C390917 | J82117094 |
| 21772580 | C390917 | J82117094 |
| 21772580 | C538742 | J82117094 |

802 → , 804 → , 806 → , 808 → , 810 → , 812 → , 814 →

Journal Metadata 236    372-1(A)

370-1

| journal ID 370 | locations 372 |
|---|---|
| J82117094 | 723 and 559 |
| J77298045 | 723 and 559 |
| J32269320 | 723 and 142 |

After Replication of journal J82117094 from instance 102-1 to instance 102-4

Object Metadata 228

| object ID 330 | chunk ID 346 | journal ID 348 |
|---|---|---|
| 58440912 | C390917 | J82117094 |
| 58440912 | C408335 | J82117094 |
| 58440912 | C098663 | J77298045 |
| 72214320 | C390917 | J82117094 |
| 66805157 | C390917 | J82117094 |
| 21772580 | C390917 | J82117094 |
| 21772580 | C538742 | J82117094 |

(Unchanged)

Journal Metadata 236    372-1(B)

370-1

| journal ID 370 | locations 372 |
|---|---|
| J82117094 | 723, 559, and 428 |
| J77298045 | 723 and 559 |
| J32269320 | 723 and 142 |

Figure 8

GROUPING OF OBJECTS IN A DISTRIBUTED STORAGE SYSTEM BASED ON JOURNALS AND PLACEMENT POLICIES

TECHNICAL FIELD

The disclosed implementations relate generally to grouping related objects together in a distributed storage system, and replicating the objects using the groupings.

BACKGROUND

The enterprise computing landscape has undergone a fundamental shift in storage architectures in which the central-service architecture has given way to distributed storage systems. Distributed storage systems built from commodity computer systems can deliver high performance, availability, and scalability for new data-intensive applications at a fraction of the cost compared to monolithic disk arrays. To unlock the full potential of distributed storage systems, data is replicated across multiple instances of the distributed storage system at different geographical locations, thereby increasing availability and reducing network distance from clients.

In a distributed storage system, objects are dynamically placed in (i.e., created in, deleted from, and/or moved to) various instances of the distributed storage system based on constraints. Existing techniques such as linear programming may be used to determine the placement of objects subject to these constraints for small-scale distributed storage systems. However, there are few existing techniques for efficiently placing objects that are subject to constraints in a planet-wide distributed storage system that stores trillions of objects and petabytes of data, and includes dozens of data centers across the planet.

One approach is to scan all object metadata, decide on the action for each individual object, and execute that action right away. However, this approach doesn't ensure timely satisfaction of placement constraints. For example, scanning trillions of objects could require weeks. In addition, this approach makes it difficult to achieve good utilization of resources (e.g., the density of objects that require action may vary widely across the whole set of objects).

SUMMARY

Disclosed implementations use a novel highly scalable scheme to reach and maintain satisfaction of object replica placement constraints for a large number of objects (e.g., trillions or quadrillions) without having to scan over all those objects periodically. Instead of managing placement constraints for individual objects, many objects are grouped together in a contiguous journal, and the journal is replicated as a whole. Because all of the objects in a journal have the same placement policy, replicating a journal reduces the resource overhead, including processors, memory, and network bandwidth. In addition, when a journal is replicated, only metadata for the single journal has to be updated, even if the journal stores content corresponding to millions of objects. The metadata for the objects identifies the journals where the object content is stored, which does not change when a journal is replicated.

Each object has an assigned placement policy, which is a set of constraints imposed on the number and locations of object replicas. Typically, there are a limited number of different placement policies in the system (e.g., 10, 20, or 50). By grouping together objects that have the same placement policy into a journal, all of the objects in a journal are manipulated together. Even if a journal holds only a few hundred or a few thousand objects, the overhead for satisfying the placement policies is greatly reduced. In addition, many objects are duplicates, and the storage system tracks all of the duplicates. However, the multiple object references point to the same physical storage of object content. That is, an unlimited number of duplicates can use the same physical storage (e.g., millions of objects pointing to a single physical storage location). Although metadata is tracked for the unlimited number of objects, the metadata does not change when their journal is replicated, saving potentially millions of metadata updates.

Some implementations split larger objects into chunks, and use chunks as the basic unit of storage rather than entire objects. For example, some implementations set a chunk size of 2 megabytes, 4 megabytes, or 8 megabytes. If an object fits within the chunk size, then an object has a single chunk. But when an object is larger than the chunk size, the object is split into a number of chunks so that each chunk is within the designated chunk size. All of the chunks from an object use the placement policy of the object, and thus may be grouped together in a single journal. However, for load balancing, some implementations have multiple journals for the same placement policy open for writes at the same time, and thus distinct chunks for the same object may be stored in different journals.

Modern enterprise-level distributed storage systems achieve high availability and durability by storing multiple replicas of every object. The locations of those replicas are usually constrained by placement policy requirements and, within those constraints, can be freely chosen to optimize various performance metrics of the system under current and/or predicted conditions (such as resource and network availability). Due to variability of these factors, storage systems have to periodically move replicas of some objects from one location to another.

However, replica moves may be expensive, as they have typically been accompanied by updates of object metadata (e.g., the locations of the object replicas). This problem is exacerbated by de-duping, which results in multiple objects (e.g., thousands or millions) referring to the same stored content. De-duping allows for an efficient usage of storage, but may potentially increase the number of metadata updates just to move a single piece of content.

Implementations achieve significant gains by grouping replicas of multiple objects together and moving each group as a whole. However, initial creation of such groups presents some challenges. From the group management perspective, it would be useful to have each group created as a concatenation of object chunks in their upload order (sometimes referred to as a journal file). When a journal reaches a certain size or time limit, the journal is closed for new writes (sometimes referred to as "sealing" the journal). After a journal is sealed, it is replicated according to the placement policy. Unfortunately this omits the usual requirement to have more than one replica of each object from the very beginning. On the other hand, if new objects arrive at many locations and each has to be appended to multiple journals, maintaining consistency across multiple replicas of the same journal becomes difficult because individual object chunks will interleave differently in different replicas of the journal.

Some implementations use replicated journals and begin the object lifecycle with two replicas at the same time at distinct instances. Each journal replica has its own chunk index of the chunks it stores, and thus the specific ordering of chunks within a journal replica is not important.

Sample Implementation

In some implementations, for each instance and each placement policy that allows storage at the instance, a set of open journal files is maintained. These are sometimes called primary journals. A primary journal is a master replica.

When a new object arrives at an instance, it is put into a primary journal associated with that instance and the object's placement policy. In general there are multiple journals at the instance that are associated with the object's placement policy in order to distribute the write load across multiple journals.

There are also secondary journals (the slave replicas) at some (or all) instances. Each secondary journal corresponds to a unique primary journal, but may be at an instance inconsistent with the designated policy. For example, a placement policy may require a replica in the United States and a replica in Europe. A primary journal could be opened in the United States, and it could have a secondary journal that is also in the United States (at a different instance). During the time period that the journal is open for new objects, those individual objects are replicated, and the cost of replication is kept minimal by having the second instance relatively close. Later, when the journal is closed, the entire journal could be replicated to an instance in Europe at a time when there is more available bandwidth. A primary journal and its corresponding secondary journal have the same journal ID because they are replicas with the same content.

Once an object chunk for a new object is stored in a primary journal, it is also transmitted to a second instance where the corresponding secondary journal is located. Thus each new object is stored at two instances. In some implementations, the object chunks are transmitted to the instance with the secondary journal as soon as the primary journal is identified. That is, once a primary journal for a chunk has been selected, the corresponding secondary journal is known, and thus replication of the chunk can be initiated. The process need not wait until the chunk is actually stored in the primary journal.

Although implementations typically have secondary journals corresponding to each primary journal, secondary journals are not required in all implementations (or for all journals within a single implementation). Some implementations provide a configurable upload mode parameter that specifies whether to store each object in a secondary journal. In some implementations, a single upload mode parameter applies to all journals, whereas in other implementations there are multiple parameters that specify which primary journals have corresponding secondary journals.

Each object's metadata specifies the journal where each of the chunks is stored. In some implementations, the object metadata includes a (chunk ID, journal ID) pair for each content chunk within the object. In some implementations, each chunk ID is the object ID plus an offset within the object. For example, if the object has object ID 517799, the chunk size is 2 Meg, and the object content is about 9 megabytes, there will be five chunks which may have chunk IDs (517799, 0), (517799, 2097152), (517799, 4194304), (517799, 6291456), and (517799, 8388608). In some implementations, a content hash or content digest is used in forming each chunk ID.

When a primary journal reaches a certain size and/or age, it gets sealed. This means that no new writes are allowed into it. At the same time, a message is sent to the instance where the corresponding secondary journal is located to close the secondary journal as well. Once the primary and secondary journals are sealed, the terms "primary" and "secondary" are no longer relevant. They are closed journal replicas.

A closed journal is eventually replicated with respect to its placement policy. This process ultimately satisfies the placement requirements for all object chunks in the journal, because all of the object chunks share the same policy.

Each journal replica has its own chunk index, and thus the same (chunk ID, journal ID) pair can be used to locate an object chunk in any replica of a journal, regardless of the physical location of the journal replica or the physical location of the chunk within the journal replica. Consequently, replication and/or moves of journals do not have to be accompanied by object metadata updates.

Simplified Sample Scenario

Consider a scenario with four instances A, B, C, D, and two placement policies P1 and P2. Policy P1 requires 3 replicas of each object, one of which is required to be on tape. Tape storage is available only at instance B. Policy P1 does not specify which instances should store each object. Policy P2 requires two replicas for each object, which are required to be at instances C and D. For simplicity, there will be only a single journal for each policy at an instance, and each object will be small enough to consist of a single chunk. In this example, journal subscripts are used to specify where a journal is located (e.g., $J1_A$ is a replica of journal J1 stored at instance A, whereas $J1_B$ is another replica of the same journal stored at instance B).

An object X has placement policy P1 and arrives at instance A. The object X is stored in a primary journal $J1_A$ located at instance A. Another copy of X is transmitted to instance C and stored in corresponding secondary journal $J1_C$. Note that the secondary journal has the same journal ID as the primary journal. Later, object Y arrives at instance A, and object Y is also assigned to placement policy P1. Object Y is stored in the same journals $J1_A$ and $J1_C$. The journal J1 stores only objects with the P1 policy.

An object Z arrives at instance A, and object Z has placement policy P2. Because policy P2 requires storage at instances C and D (not instance A), instance A forwards object Z for storage in primary journal $J2_C$ located at instance C. In some implementations, the primary journal must be at an instance that is consistent with the policy, such as instance C here. In other implementations, the primary journal could be at an instance that is not even allowed by the policy. This anomaly, however, is short lived, because once a journal is closed, the journal is moved or replicated according to the assigned placement policy. In this example scenario, the secondary journal $J2_B$ is at instance B. The object Z is replicated to instance B for storage in that corresponding secondary journal. Although instance B has tape data storage, open journals are generally not stored on tape because of the physical nature of a tape (e.g., the overhead of mounting the appropriate tape and locating the appropriate write position on the tape would be inefficient for small write operations). The journal $J2_B$ may be stored in a file system or other data store, such as a Big Table data store.

Because there are two replicas of each object X, Y, and Z, each of the objects would still be available if one of the instances goes down. At some point, journals J1 and J2 are closed.

Once the journals J1 and J2 are sealed, their locations are evaluated against their placement policies. Currently journal J1 has two replicas, neither of which is stored on tape. Therefore, either the replica at instance A or the replica at instance C is copied to instance B for storage in a tape store.

Once completed, there will be three replicas, one of which is a tape store. This satisfies the requirements of policy P1.

For journal J2, there are two replicas, but they are at instances C and B rather than at instances C and D as required by policy P2. A copy of journal J2 needs to be replicated to instance D. The source for the replication could come from either instance C or instance B. Depending on available resources (e.g., network bandwidth from instance B to instance D versus network bandwidth from instance C to instance D), one of the two sources is selected, creating a third replica of journal J2 at instance D. Once this occurs, the copy of journal J2 at instance B can be deleted.

Also note that replication to instance D does not have to occur immediately. If instance D is busy, or network bandwidth to instance D is very limited, replication of the journal J2 to instance D can be delayed.

According to some implementations, a method for managing placement of object replicas in a distributed storage system is performed at a first instance of the distributed storage system. The first instance has one or more servers, each having one or more processors and memory. The memory stores a plurality of objects and also stores one or more programs for execution by the one or more processors. One or more journals are opened for storage of object chunks. Each journal is associated with a single respective placement policy. In some implementations, each placement policy specifies a target number of object replicas and target locations for those replicas. The first instance receives a first object comprising at least a first object chunk. The first object is associated with a first placement policy. The first object chunk is stored in a first journal whose associated placement policy matches the first placement policy. The first journal stores only object chunks for objects whose placement policies match the first placement policy. For the first journal, the receiving and storing operations are repeated for a first plurality of objects whose associated placement policies match the first placement policy, until a first termination condition occurs. In some implementations, the first termination condition occurs after a predefined span of time or after the first journal has exceeded a predefined size threshold. After the first termination condition occurs, the first journal is closed, thereby preventing any additional object chunks from being stored in the first journal. Subsequently, the first journal is replicated to a second instance of the distributed storage system in accordance with the first placement policy.

BRIEF DESCRIPTION OF THE DRAWINGS

FIG. 8 illustrates what happens to object metadata and journal metadata when a journal is replicated from one instance to another, in accordance with some implementations.

Like reference numerals refer to corresponding parts throughout the drawings.

DESCRIPTION OF IMPLEMENTATIONS

Before discussing techniques for managing the placement of objects in a distributed storage system, it is instructive to present an exemplary system in which these techniques may be used.

Distributed Storage System Overview

Figure 1:
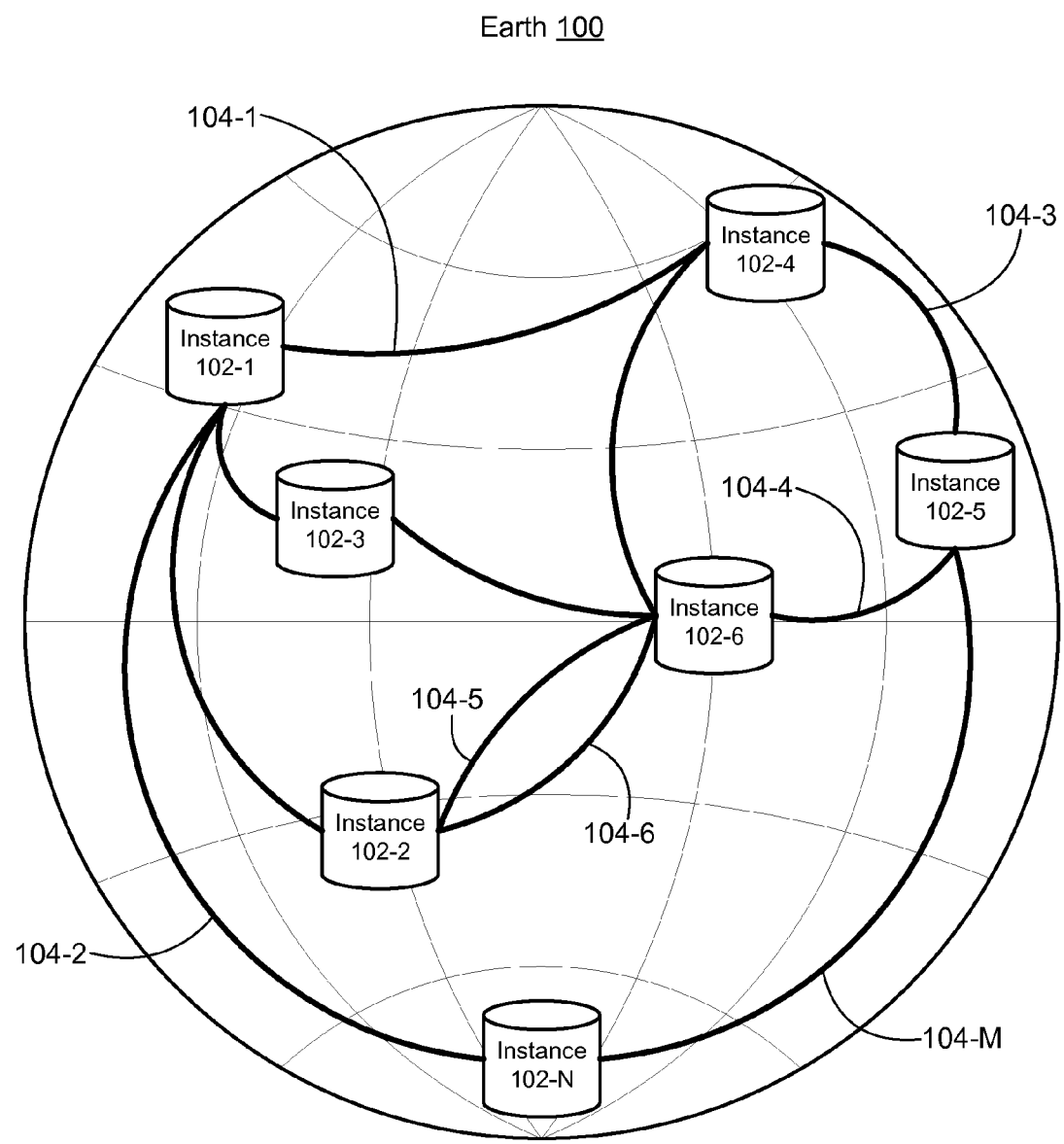
FIG. 1 is a conceptual illustration of a distributed storage system, according to some implementations.

As illustrated in FIG. 1, the disclosed implementations describe a distributed storage system. There are multiple instances 102-1, 102-2, . . . 102-N at various locations on the Earth 100, connected by network communication links 104-1, 104-2, . . . 104-M. Note that an "instance" is also referred to as a "storage location" in this specification. Also note that one or more instances (storage locations) may be located at a particular physical location (e.g., a building, a set of buildings within a predetermined distance of each other, etc.). In some implementations, an instance (such as instance 102-1) corresponds to a data center. In some implementations, multiple instances are physically located at the same data center. A single implementation may have both individual instances at distinct geographic locations as well as one or more clusters of instances, where each cluster includes a plurality of instances, and the instances within each cluster are at a single geographic location.

Figure 4:
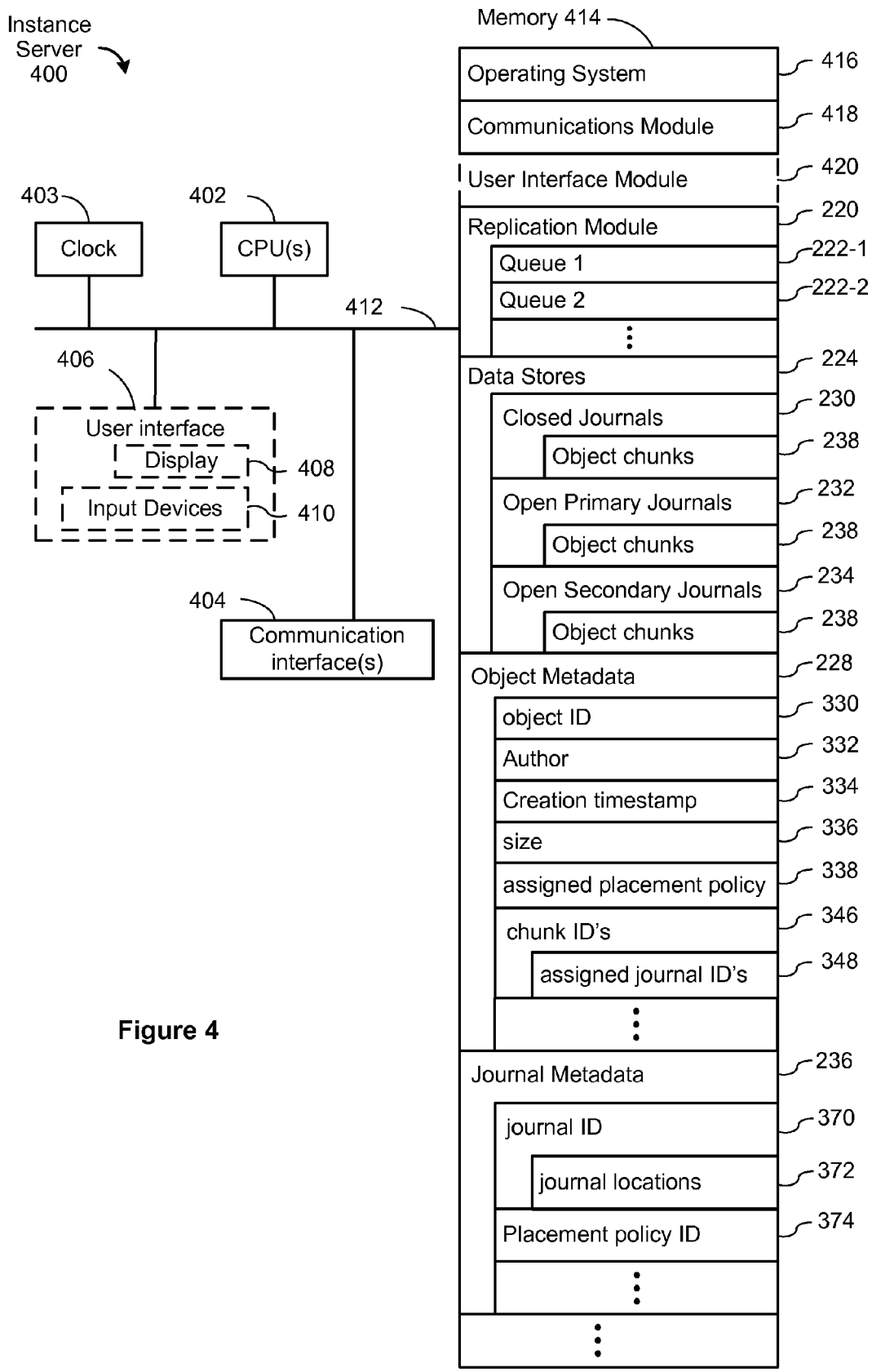
FIG. 4 is a block diagram of an instance server, according to some implementations.

Although the conceptual diagram of FIG. 1 illustrates a particular number of network communication links 104-1, etc., typical implementations may have more or fewer network communication links. In some implementations, there are two or more network communication links between the same pair of instances. For example, the network communication links 104-5 and 104-6 provide network connectivity between instance 102-2 and instance 102-6. In some implementations, the network communication links include fiber optic cable. In some implementations, some of the network communication links use wireless technology, such as microwaves. In some implementations, each network communication link has a specified bandwidth and/or a specified cost for the use of that bandwidth. In some implementations, statistics are maintained about the transfer of data across one or more of the network communication links, including throughput rate, times of availability, reliability of the links, etc. Each instance typically has data stores and associated databases, and utilizes a farm of server computers ("instance servers" as illustrated in FIG. 4) to perform all of the tasks. In some implementations, one or more instances of the distribute storage system has limited functionality. For example, the limited functionality may include acting as a repeater for data transmissions between other instances. Note that limited functionality instances may or may not include any of the data stores.

Figure 2:
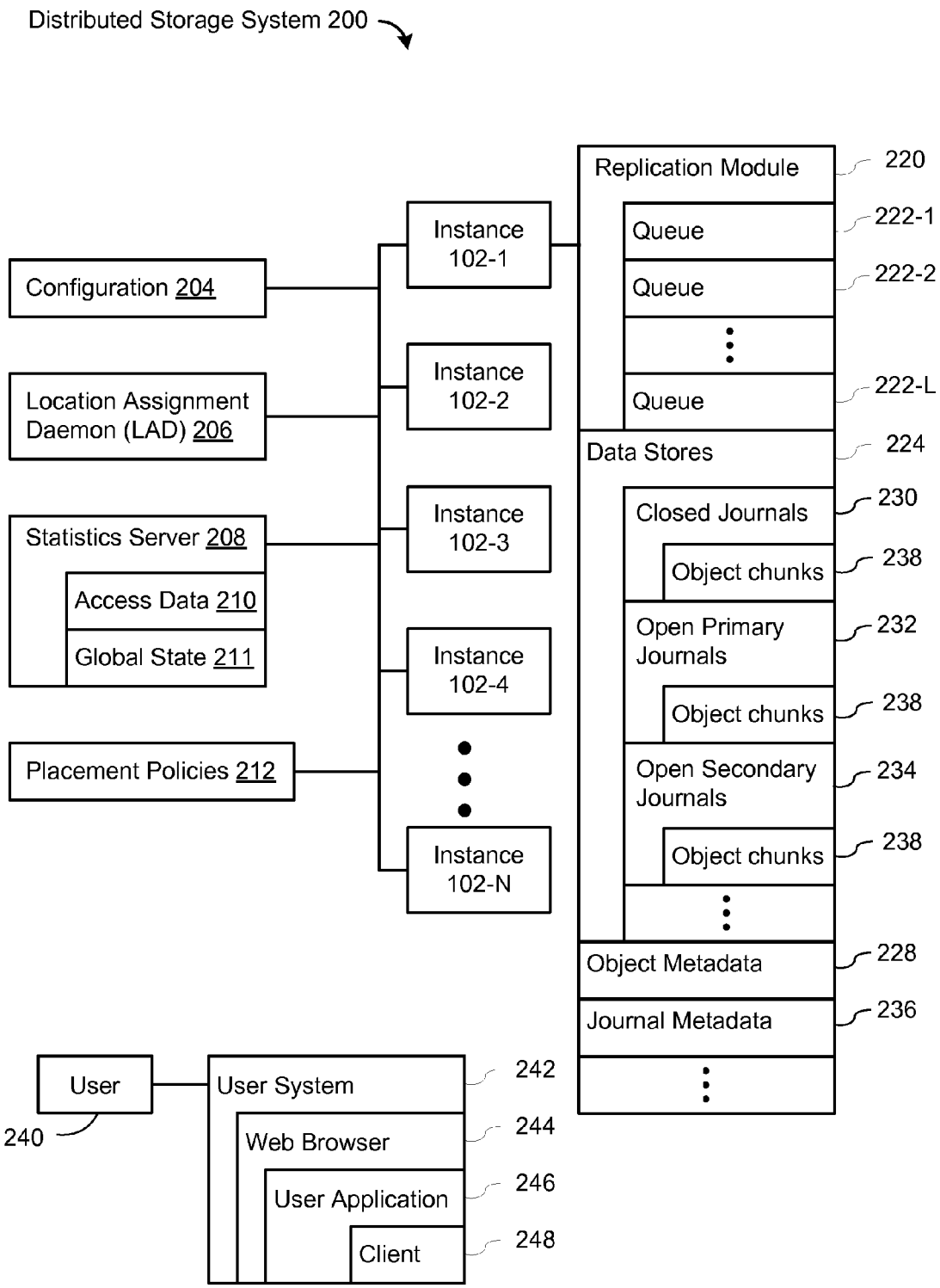
FIG. 2 is a block diagram illustrating the elements of a distributed storage system, according to some implementations.
Figure 6:
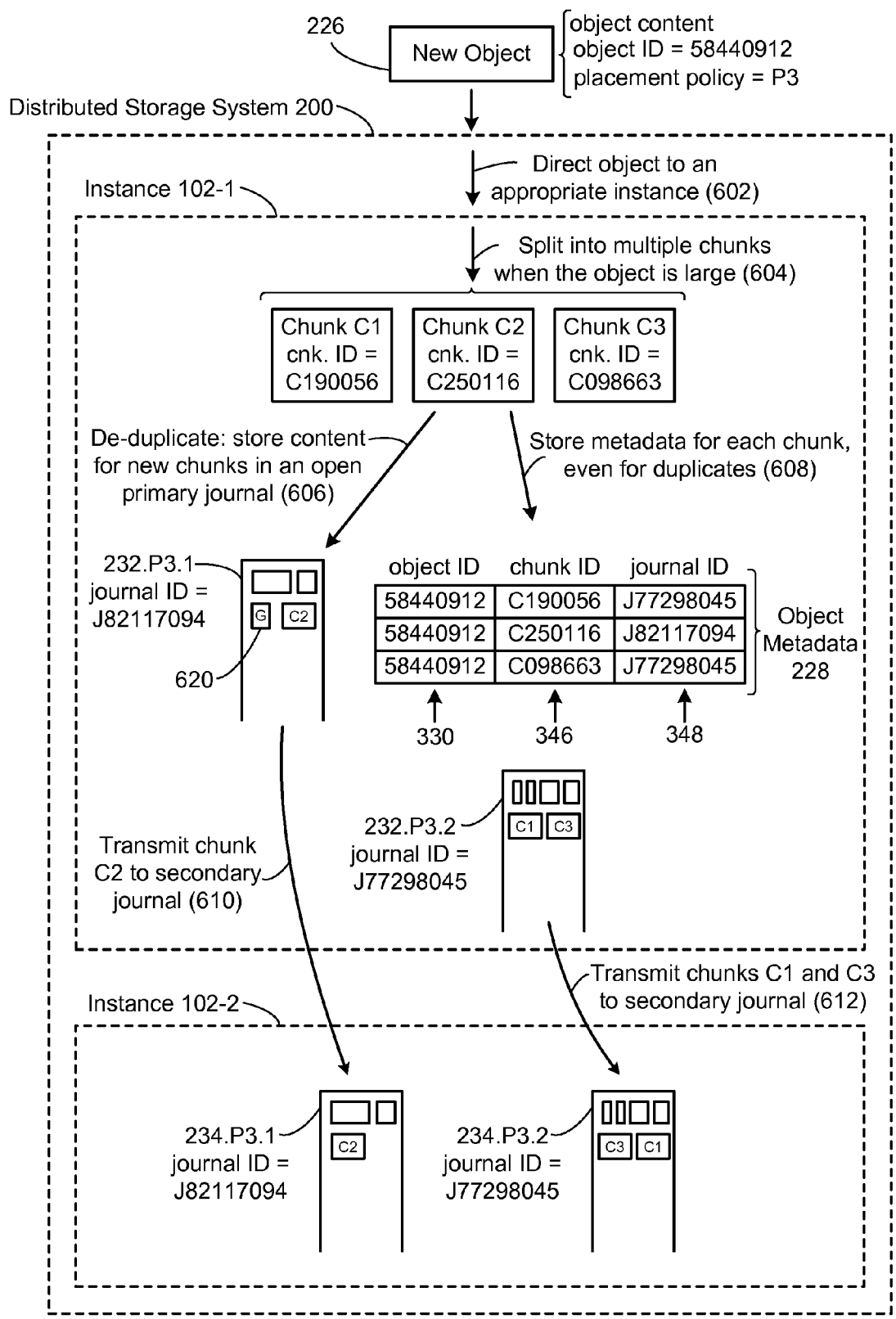
FIG. 6 illustrates how some implementations manage the storage of a new object.

FIG. 2 is a block diagram illustrating the elements of a distributed storage system 200, according to some implementations. The distributed storage system 200 includes instances 102-1, 102-2, 102-3, 102-4, . . . 102-N. A respective instance 102-1 includes a replication module 220 that replicates object chunks 238 between instances. In some implementations, the object chunks 238 are stored in data stores 224 of the respective instance 102-1. Each object chunk 238 comprises an object 226 or a portion of an object 226, as illustrated in FIG. 6. The data stores 224 may include distributed databases, file systems, tape backups, and any other type of storage system or device capable of storing objects. In some implementations, the replication module 220 uses one or more replication queues 222-1, 222-2, . . . , 222-L to replicate objects 226 or journals 230. Replication requests for objects or journals to be replicated are placed in a replication queue 222, and the objects or journals are replicated when resources (e.g., bandwidth) are available. In some implementations, replication requests in a replication queue 222 have assigned priorities, and the highest priority replication requests are replicated as bandwidth becomes available.

In some implementations, a background replication process creates and deletes copies of objects or journals based on placement policies 212 and access data 210 and/or a global state 211 provided by a statistics server 208. The placement policies 212 specify how many copies of an object are desired, where the copies should reside, and in what types of data stores the data should be saved. Using placement policies 212, together with the access data 210 (e.g., data regarding storage locations at which replicas of objects were accessed, times at which replicas of objects were accessed at storage locations, frequency of the accesses of objects at the storage locations, etc.) and/or the global state 211 provided by the statistics server 208, a location assignment daemon (LAD) 206 determines where to create new copies of an object or journal and what copies may be deleted. When new copies are to be created, replication requests are inserted into a replication queue 222. In some implementations, the LAD 206 manages replicas of objects or journals globally for the distributed storage system 200. In other words, there is only one LAD 206 in the distributed storage system 200. The use of the placement policies 212 and the operation of a LAD 206 are described in more detail below.

Note that in general, a respective placement policy 212 may specify the number of replicas of an object to save, in what types of data stores the replicas should be saved, storage locations where the copies should be saved, etc. In some implementations, a respective placement policy 212 for an object includes criteria selected from the group consisting of a minimum number of replicas of the object that must be present in the distributed storage system, a maximum number of the replicas of the object that are allowed to be present in the distributed storage system, storage device types on which the replicas of the object are to be stored, locations at which the replicas of the object may be stored, locations at which the replicas of the object may not be stored, and a range of ages for the object during which the placement policy for the object applies. For example, a first placement policy may specify that each object in a webmail application must have a minimum of 2 replicas and a maximum of 5 replicas, wherein the replicas of the objects can be stored in data centers outside of China, and wherein at least 1 replica of each object must be stored on tape. A second placement policy for the webmail application may also specify that for objects older than 30 days, a minimum of 1 replica and a maximum of 3 replicas are stored in the distributed storage system 200, wherein the replicas of the objects can be stored in data centers outside of China, and wherein at least 1 replica of each object must be stored on tape.

In some implementations, a user 240 interacts with a user system 242, which may be a computer system or other device that can run a web browser 244. A user application 246 runs in the web browser, and uses functionality provided by database client 248 to access data stored in the distributed storage system 200 using a network. The network may be the Internet, a local area network (LAN), a wide area network (WAN), a wireless network (WiFi), a local intranet, or any combination of these. In some implementations, the database client 248 uses information in a global configuration store 204 to identify an appropriate instance to respond to the request. In some implementations, user application 246 runs on the user system 242 without a web browser 244. Exemplary user applications include an email application and an online video application.

In some implementations, each instance stores object metadata 228 for each of the objects stored in the distributed storage system. Some instances store object metadata 228 only for the objects that have replicas stored at the instance (referred to as a "local instances"). Some instances store object metadata 228 for all objects stored anywhere in the distributed storage system (referred to as "global instances"). The object metadata 228 is described in more detail with respect to FIGS. 3, 4, and 5.

In some implementations, each instance stores journal metadata 236 for each of the journals stored in the distributed storage system 200. Some instances store journal metadata 236 only for the journals that have replicas stored at the instance. Some instances store journal metadata for all journals stored anywhere in the distributed storage system. The journal metadata is described in more detail below with respect to FIGS. 3, 4, 5, and 8.

Stored in the data stores 224 are multiple types of journals. The majority of the journals are closed journals 230. Closed journals 230 do not store any additional object chunks, but can have content deleted and compacted. In some implementations, two or more small closed journals 230 for the same placement policy 212 can be stitched together to form a single replacement closed journal 230. Because data within a closed journal 230 can be deleted and compacted, closed journals 230 can get smaller over time, and thus become candidates for stitching.

In addition to the closed journals 230, an instance 102 can have open journals 232 and 234. As indicated in FIG. 2, open journals are designated as either primary journals 232 or secondary journals 234. Primary journals 232 and secondary journals 234 come in pairs, and are located at distinct instances. As described in more detail below, a primary journal 232 receives a chunk 238 for storage and transmits a copy of the chunk 238 to the instance where the corresponding secondary journal 234 is stored.

Figure 3:
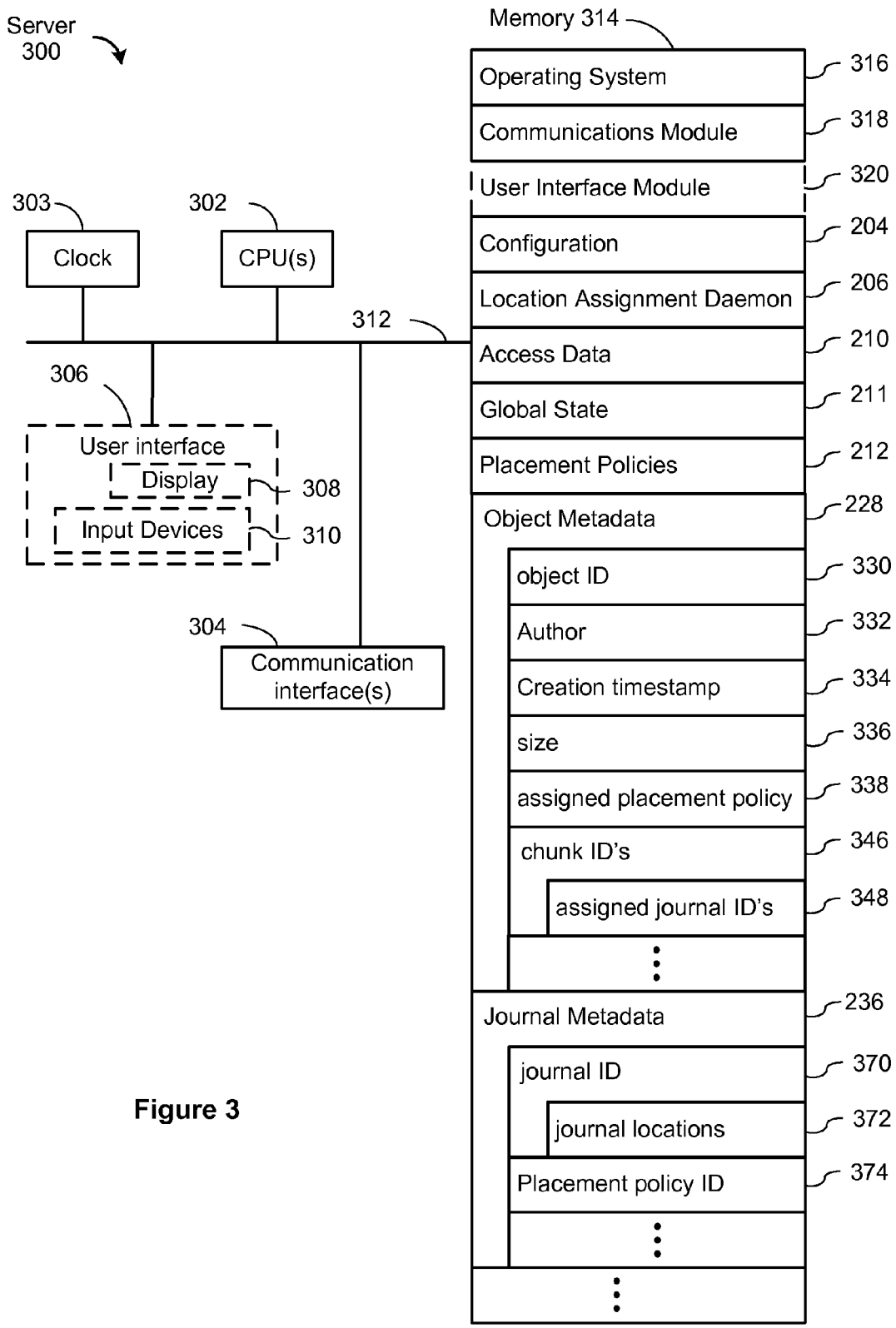
FIG. 3 is a block diagram of a server, according to some implementations.

FIG. 3 is a block diagram of a server 300, according to some implementations. The server 300 typically includes one or more processing units (CPU's) 302, a clock 303 that reports the current date and/or time, one or more network or other communications interfaces 304, memory 314, and one or more communication buses 312 for interconnecting these components. The communication buses 312 may include circuitry (sometimes called a chipset) that interconnects and controls communications between system components. In some implementations, the clock 303 is a local clock that is periodically synchronized with a clock server (e.g., a quorum clock server or any other clock server on a network, etc.). The server 300 optionally may include a user interface 306 comprising a display device 308 and input devices 310 (e.g., keyboard, mouse, touch screen, keypads, etc.). Memory 314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may optionally include one or more storage devices remotely located from the CPU(s) 302. Memory 314, or alternately the non-volatile memory device(s) within memory 314, comprises a computer readable storage medium. In some implementations, memory 314 stores the following programs, modules and data structures, or a subset thereof:

- an operating system 316 that includes procedures for handling various basic system services and for performing hardware dependent tasks;
- a communication module 318 that is used for connecting the server 300 to other computers via the one or more communication interfaces 304 (wired or wireless) and one or more communication networks, such as the Internet, other wide area networks, local area networks, metropolitan area networks, and so on;
- an optional user interface module 320 that receives commands from the user via the input devices 310 and generates user interface objects in the display device 308;
- the configuration 204, as described herein;
- the LAD 206, as described herein;
- access data 210, as described herein;
- the global state 211, as described herein;
- the placement policies 212, as described herein;
- object metadata 228 for the objects stored in the distributed storage system. The object metadata 228 may include an object ID 330, which uniquely identifies the object within the distributed storage system. The metadata 228 may include the author 332 of the object, which may be a name and/or identifier of a person or entity (e.g., email address). In some implementations, the identifier is unique. The metadata may include a datestamp or timestamp 334 when the object was created (e.g., uploaded to the distributed storage system). The metadata may include the size 336 of the object, which is typically measured in bytes or allocation blocks. The metadata includes an assigned placement policy 338, which may be assigned individually or based on other criteria (e.g., all videos uploaded from the United States may have the same assigned placement policy 338). The usage of placement policies is described in more detail below with respect to FIGS. 5-6 and 9A-9C. The metadata 228 includes a set of chunk ID's 346 that identify the content chunks for each object. In some implementations, a chunk ID is specified as an offset within an object. For example, the first chunk has an offset of 0. In some implementations, the offsets are specified in megabytes. In some implementations, the chunk ID's are unique identifiers (such as a GUID). In some implementations, each chunk ID is formed by concatenating the object ID with the offset of the chunk. In some implementations, the chunk ID if formed using a content hash or content digest. Corresponding to each chunk ID is an assigned journal ID 348, which indicates in which journal the corresponding chunk is stored; and
- journal metadata 236 for each journal stored in the distributed storage system 200. The journal metadata 236 includes a journal ID 370 for each journal and a set of journal locations 372 where the journal is stored. The journal locations 372 specify each instance 102 where the journal is stored any may specify the data store 224 at the instance 102 that stores the journal. The journal metadata 236 also includes the placement policy ID 374 associated with each journal. The placement policy ID 374 identifies the unique placement policy 212 associated with the journal.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 314 may store a subset of the modules and data structures identified above. Furthermore, memory 314 may store additional modules and data structures not described above.

Although FIG. 3 shows a "server," FIG. 3 is intended more as functional description of the various features that may be present in a set of servers 300 than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers and how features are allocated among them will vary from one implementation to another, and may depend in part on the amount of data traffic that the system must handle during peak usage periods as well as during average usage periods. In some implementations, a subset of the LAD 206, the access data 210, the global state 211, and the placement policies 212 are located on separate servers. For example, the LAD 206 may be located at a server (or set of servers), the access data 210 and the global state 211 may be located and maintained by a statistics server 208 (or a set of statistics servers 208), and the placement policies 212 may be located on another server (or a set of other servers).

FIG. 4 is a block diagram of an instance server 400 for an instance 102, according to some implementations. The instance server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some implementations, the clock 403 is a local clock that is periodically synchronized with a clock server (e.g., a quorum clock server or any other clock server on a network, etc.). In some implementations, the instance server 400 includes a user interface 406 comprising a display device 408 and one or more input devices 410. In some implementations, memory 414 includes high-speed random access memory, such as DRAM, SRAM, DDR RAM or other random access solid state memory devices. In some implementations, memory 414 includes non-volatile memory, such as one or more magnetic disk storage devices, optical disk storage devices, flash memory devices, or other non-volatile solid state storage devices. In some implementations, memory 414 includes one or more storage devices remotely located from the CPU(s) 402. Memory 414, or alternately the non-volatile memory device(s) within memory 414, comprises a computer readable storage medium. In some implementations, memory 414 or the computer readable storage medium of memory 414 stores the following programs, modules and data structures, or a subset thereof:
- an operating system 416 that includes procedures for handling various basic system services and for performing hardware dependent tasks;
- a communications module 418 that is used for connecting the instance server 400 to other instance servers or computers via the one or more communication network interfaces 404 (wired or wireless) and one or more communication networks, such as the Internet, other wide area networks, local area networks, metropolitan area networks, and so on;
- an optional user interface module 420 that receives commands from the user via the input devices 410 and generates user interface objects in the display device 408;
- a replication module 220 and replication queues 222, as described herein;
- data stores 224 (e.g., distributed databases, file systems, tape stores, Big Tables, etc.) that store the object chunks 238 in journals 230, 232, and 234 as described with respect to FIG. 3;
- object metadata 228 and corresponding metadata elements 330-338, 346, and 348 as described in FIG. 3 with respect to server 300; and
- journal metadata 236 and corresponding journal metadata elements 370, 372, and 374 as described in FIG. 3 with respect to server 300.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 414 may store a subset of the modules and data structures identified above. Furthermore, memory 414 may store additional modules and data structures not described above.

Although FIG. 4 shows an "instance server," FIG. 4 is intended more as functional description of the various features that may be present in a set of instance servers 400 than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers and how features are allocated among them will vary from one implementation to another, and may depend in part on the amount of data traffic that the server must handle during peak usage periods as well as during average usage periods. For example, at a single instance 102 there may be a hundred instance servers 400 or thousands of instance servers 400.

In some implementations, to provide faster responses to clients and to provide fault tolerance, each program or process that runs at an instance is distributed among multiple computers. The number of instance servers 400 assigned to each of the programs or processes can vary, and depends on the workload.

Figure 5:
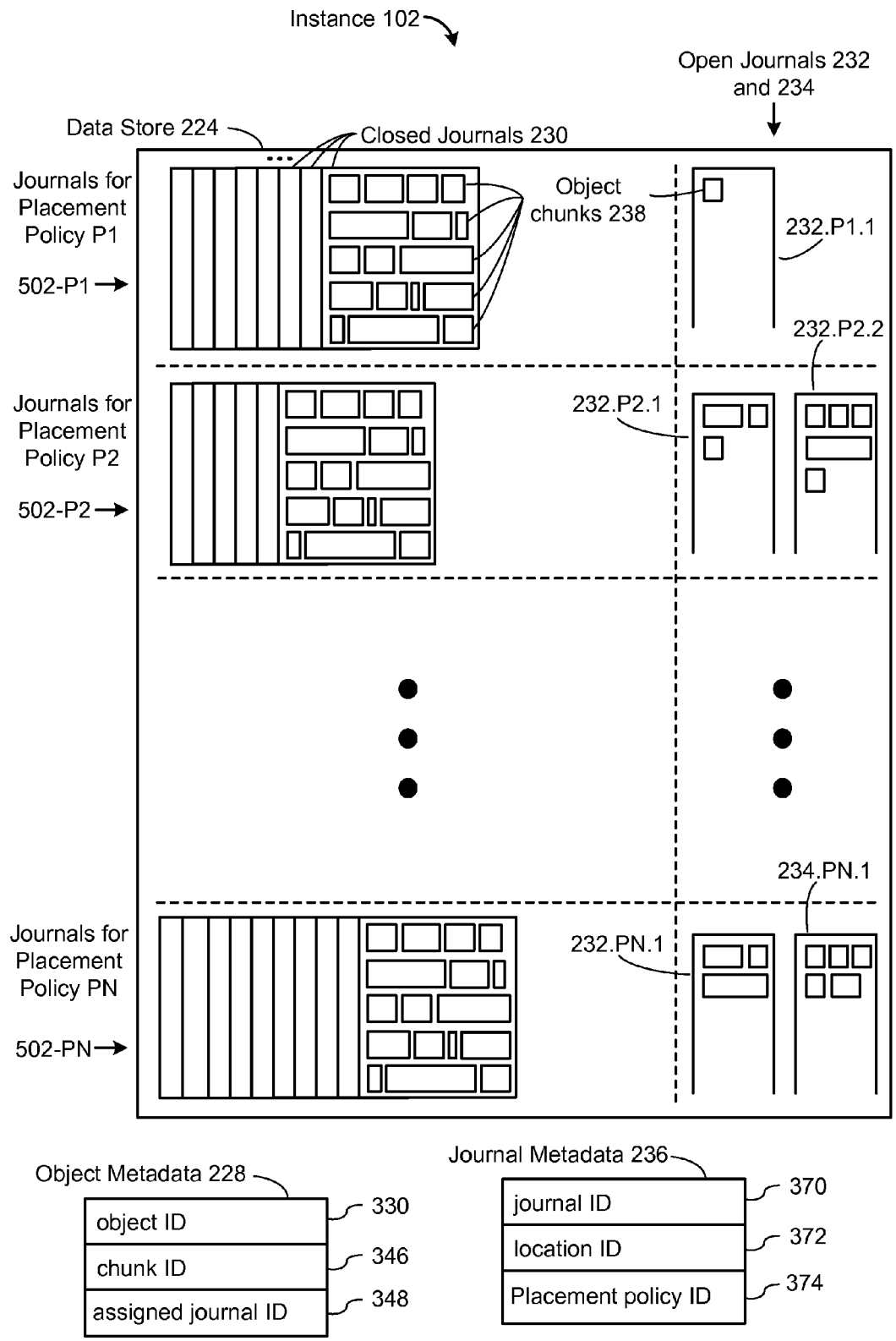
FIG. 5 illustrates the use of journals for storage of object chunks in accordance with some implementations.

FIG. 5 illustrates the use of journals for storage of object chunks in accordance with some implementations. FIG. 5 shows a data store 224, as well as a portion of the object metadata 228 and a portion of the journal metadata 236, all at an example instance 102. There are many journals 230, 232, and 234 stored in this data store 224, so it is useful to organize them visually in a two dimensional grid. (Of course the visual display is irrelevant to the actual physical storage of journals in a data store.) In the figure, the journals are partitioned into "rows" of journals, where each row corresponds to a single placement policy 212. For example, the first row 502-P1 corresponds to placement policy P1 (212), and includes closed journals 230, open primary journals 232, and open secondary journals 234. All of these journals in the first row 502-P1 are associated with the placement policy P1. The second row 502-P2 corresponds to placement policy P2 (212), and the last row 502-PN corresponds to placement policy PN (212). Typically the number of placement policies is small, such as 10, 20, 50, or perhaps 100. When the number of placement policies grows, management of object replicas becomes less efficient.

The journals in the data store 224 are also partitioned visually into two columns in FIG. 5. The first column identifies the closed journals 230, which is the majority of the journals. The second column includes the open primary journals 232 and the open secondary journals 234. As illustrated by the various rectangles 238 in each journal, each journal (whether closed 230, open primary 232, or open secondary 234) contains object chunks 238. The object chunks can be various sizes, but implementations typically set a fixed maximum size (e.g., 2 megabytes, 4 megabytes, or 8 megabytes). The illustration of object chunks 238 within a journal correctly conveys the fact that a journal stores many object chunks of various sizes, but is otherwise not representative of the actual physical storage of object chunks (e.g., there is generally no unused space between object chunks because each new object chunk 238 is appended at the beginning of the unallocated space).

FIG. 5 illustrates that various combinations of open journals 232 and 234 are possible for each placement policy. To identify the different journals replicas in the figures and descriptions herein, a three part label is sometimes used, such as "232.P4.7". The first portion (e.g., "232") identifies the type of journal (230=closed, 232=open primary, 234=open secondary); the second portion (e.g., "P4") specifies the placement policy for the journal; and the third portion (e.g., "7") just specifies a sequential number for the journal (e.g., the "7" in "232.P4.7" specifies the seventh open journal for placement policy P4).

As illustrated in FIG. 5, for placement policy P1 there is a single open primary journal 232.P1.1, and no open secondary journals. For placement policy P2, there are two open primary journals 232.P2.1 and 232.P2.2. For placement policy PN, there is one open primary journal 232.PN.1 and one open secondary journal 234.PN.1. As these examples illustrate, the number of open primary journals 232 and open secondary journals 234 can vary between placement policies, and is typically configured for each policy 212 based on the expected number of new objects 226 for each placement policy 212 and the desired locations for those objects 226

Each instance 102 also stores both object metadata 228 and journal metadata 236, as previously described with respect to FIG. 3. For each object 226, the object metadata 228 includes the object ID 330 (which uniquely identifies the object), a set of one or more chunk IDs 346 that identify the object chunks 238 from the object, and an assigned journal ID 348 associated with each chunk ID 236. When an object has multiple chunks 238, the chunks 238 are not necessarily all stored in the same journal (e.g., for load balancing), so the object metadata 228 must track the journal ID 348 assigned to each chunk ID 346.

Each instance 102 also stores journal metadata 236 for each journal stored at the instance 102. The metadata 236 includes a journal ID 370 for each journal, as well as a set of locations 372. In some implementations, a location ID identifies an instance where the journal is stored. In some implementations, a location ID also identifies a data store at the specified instance. In some implementations, an instance identifier and a data store identifier are stored as separate attributes for each journal. In some implementations, a journal may be stored in two or more data stores at a single instance (e.g., a file system data store and a tape backup data store). The journal metadata 236 also includes a placement policy ID 374 that specifies the unique placement policy 212 corresponding to each journal. Each journal stores only object chunks 238 whose placement policies 338 match the placement policy of the journal.

FIG. 6 illustrates how some implementations manage the storage of a new object 226. As illustrated in FIG. 6, each new object has object content (i.e., the object 226 itself), as well as an object ID 330 (e.g., 58440912) and an assigned placement policy 330 (e.g., P3). The new object 226 can come from many different applications 246, such as an online email application, a video sharing website, and so on. The distributed storage system 200 receives the new object 226 and directs (602) the new object 226 to an appropriate instance, such as the instance 102-1. In some implementations, the application 246 directs the new object 226 to a specific instance 102-1. When the instance 102-1 selected by the application 246 is not proper, some implementations forward the object 226 to an appropriate instance (e.g., if the placement policy 212 specifies no storage in Europe, and the object 226 is received at an instance in Europe, the instance can forward the object 226 to another instance).

Although most objects have moderate size (e.g., less than 300 kilobytes), there are some objects that are large. Some implementations split (604) large objects into multiple chunks 238. In general, each implementation sets a chunk size or has a configurable parameter to set the chunk size, which is typically specified in megabytes (e.g., 2, 4, 8, 16, or 32 megabytes). Each object that is larger than the chunk size is split into multiple chunks, and each object that has size equal to or less than the chunk size consists of a single chunk. In the illustration in FIG. 6, there are three chunks C1, C2, and C3. In this illustration, each of the chunks has a 7 character alphanumeric chunk ID 346, but many alternative chunk ID formats are possible that uniquely identify the chunks within each object. In some implementations, a chunk ID 346 is generated using a content hash or content digest.

In some implementations there can be many object duplicates (e.g., an email attachment sent to a group of people, then forwarded to many additional people), so de-duplication can be useful for efficient storage. Thus, in some embodiments, the content of each new chunk 238 is compared (606) to existing object chunks 238 (e.g., using a content hash or content digest) to store only (606) "new" chunks 238 in an open primary journal. As illustrated in FIG. 5, chunk C2 is new, and corresponds to placement policy P3, so chunk C2 is stored in an open primary journal 232.P3.1 corresponding to placement policy P3.

Regardless of whether the object chunk C2 is new, the instance 102-1 stores (608) object metadata 228 for the chunk 238. As described previously with respect to FIGS. 3-5, the metadata 228 includes the object ID 330, the chunk ID 346, and the journal ID 348 for the journal where each chunk is stored. In some implementations, the chunk ID 346 for an object chunk 238 is just the offset to the start of the chunk 238 within the object. The object metadata 228 shown in FIG. 6 also illustrates that the chunks for a single object need not be stored in the same journal. The chunks C1 and C3 (chunk IDs C190056 and C098663) are in the journal 232.P3.2 with journal ID J77298045, whereas chunk C2 (chunk ID C250116) is in the journal 232.P3.1 with journal ID J82117094.

The chunk C2 is transmitted (610) to instance 102-2 for storage in secondary journal 234.P3.1, and chunks C1 and C3 are transmitted (612) to instance 102-2 for storage in secondary journal 234.P3.2.

FIG. 6 also illustrates that a primary journal 232 need not be physically identical to its corresponding secondary journal. First, we see that chunks C1 and C3 are stored in that order in the primary journal 232.P3.2, whereas these chunks are stored in the reverse order in the secondary journal 234.P3.2. While a journal is open, the individual chunks 238 may be replicated independently, traverse different network paths, or be processed by different processors 402, so there is no guarantee that they are loaded into the secondary journal 234.P3.2 in the same order. The fact that there can be different orders is handled by the chunk index within each journal as described below with respect to FIG. 7. In addition, primary journal 232.P3.1 indicates the presence of a garbage "chunk" 620 labeled as "G" in the figure. Sometimes during an upload there can be failure or glitch that consumes space. For example, during an upload, perhaps the space for an object is allocated, but the chunk is not actually appended. The software retries the upload, which allocates new space for the chunk. This can leave holes or garbage within a journal 232. In this case the garbage 620 is not transmitted to the secondary journal, so the primary journal is physically different from the secondary journal.

Figure 7:
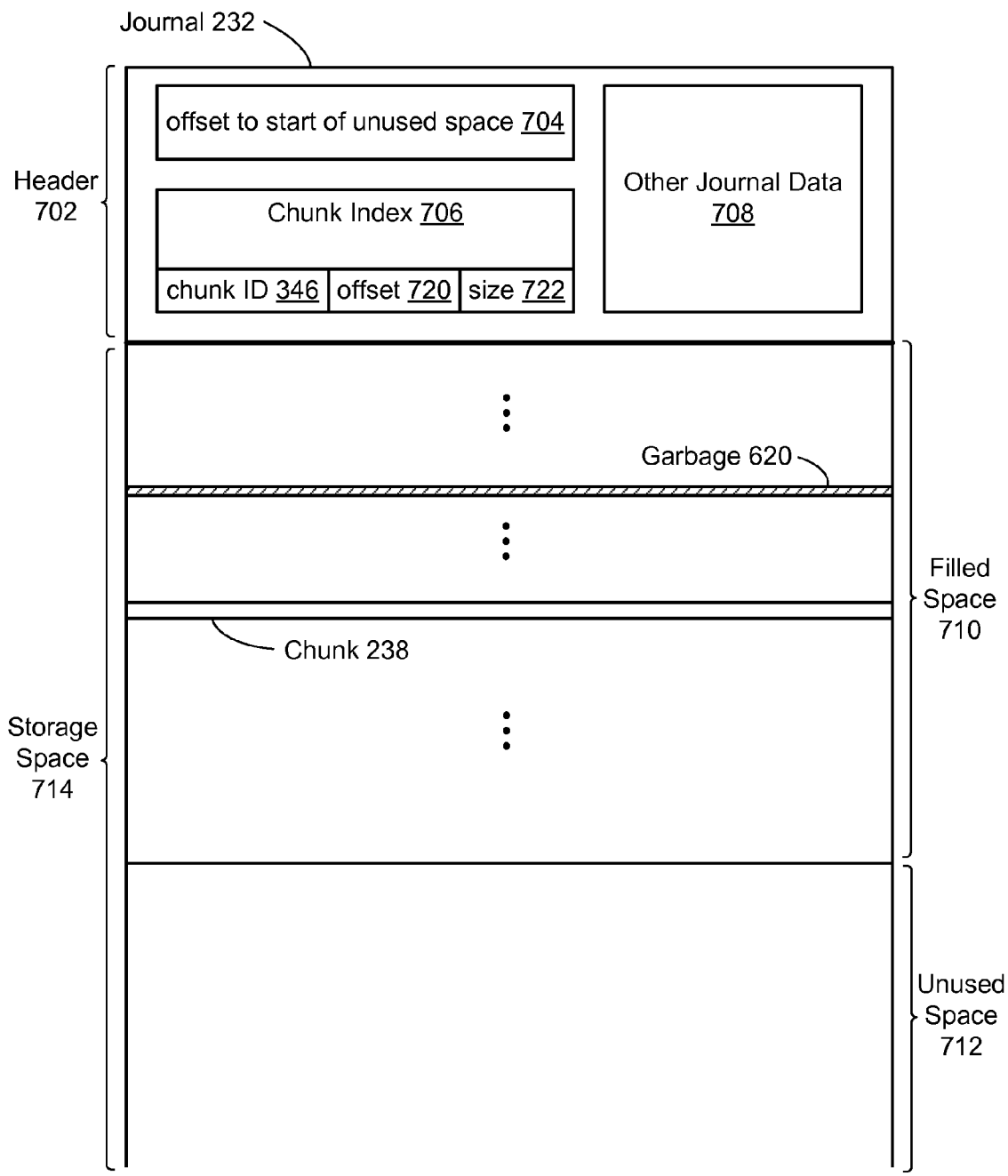
FIG. 7 illustrates the structure of an open journal in accordance with some implementations.

FIG. 7 illustrates the structure of an open journal in accordance with some implementations. Although FIG. 7 describes an open primary journal 232, the structure or an open secondary journal 234 would be the same or similar. A journal 232 has a header 702 and a block of storage space 714. The storage space 714 includes a filled portion 710 that is already storing object chunks 238, and an unfilled portion 712 that is currently unused. These descriptors are not completely accurate for a few reasons. First, the "filled" space 710 may include garbage portions 620 that have no useful content. Second, the unused space is not necessarily allocated all at the same time. Some implementations do allocate the entire space for the journal at one time, and close the journal when it is filled (potentially leaving a small amount of unused space at the end). But in other implementations, blocks of additional space are allocated as needed, until the journal reaches a certain size limit or a certain amount of time has elapsed (e.g., one day).

The header 702 for the journal contains important internal information about the journal 232. The header 702 includes a field 704 that specifies where the unused space 712 begins in the journal. Each time a new chunk 238 is appended to the end of the filled space 710, the offset 704 is incremented by the size of the chunk 238 so that the journal 232 is prepared to store the next chunk.

The header 702 also includes a chunk index 706. The chunk index 706 for a journal 232 specifies where each chunk 238 is located within the journal 232 as well as its size, enabling a rapid read of the chunk data (whether from non-volatile storage or from cache). The key for the chunk index 706 is the chunk ID 346, which uniquely identifies the chunk. Note that multiple distinct object ID's 330 may refer to the same physical chunks. To avoid a huge chunk index 704 with many entries pointing to the same object chunk 238, implementations typically utilize a single chunk ID to refer to the same physical content. For example, the chunk ID 346 may be a content hash or a content digest (or a combination of these). For each chunk ID 346, the chunk index 720 specifies an offset 720 and a size 722 for the chunk 238 within the storage space 714. The offset 720 may be specified either as an offset from the beginning of the journal 232 or an offset from the beginning of the filled space 710. In some implementations, the chunk index has additional information, such as a deletion marker that is used later when chunks are deleted and the filled space 710 compacted.

The header 702 may contain other journal data 708 as well to address implementation details. For example, the other journal data 708 may specify the offset from the beginning of the journal to the beginning of the storage space 714 (i.e., the size of the header). In some implementations, the other journal data includes a "time to live" parameter for journals that are designated to have a short lifespan.

Although the structure of the journal in FIG. 7 is for an open primary journal 232, the same basic structure applies to open secondary journals 234 and closed journals 230 as well.

FIG. 8 illustrates what happens to object metadata 228 and journal metadata 236 when a journal is replicated from one instance to another, in accordance with some implementations. In this illustration, closed journal 230 with journal ID J82117094 is replicated (820) from instance 102-1 (with instance ID=723) to instance 102-4 (with instance ID 428). Because the journal 230 itself is replicated as a unit, the entire content is replicated exactly. For example, chunk C8 (with chunk ID C408335) is in exactly the same position within the journal. Of course after replication, instance 102-1 and 102-4 independently handle deletion and compaction, so their physical structures are not guaranteed to stay the same after replication.

FIG. 8 also shows a portion of the object metadata 228 and journal metadata 236, both before and after the replication 820. As indicated, the records 802-814 in the object metadata 228 are unchanged by the replication 820. Each object 226 has the same chunks 238, and the chunks 238 are stored in the same journal 230. For example, the chunk with chunk ID C408335 (in row 804) is unchanged. On the other hand, the journal metadata 236 for the journal 230 with journal ID J82117094 (370-1) does change. The set of journal locations 372 changes from 372-1(A) to 372-1(B), which includes the new location 428 (for instance 102-4).

Figure 9A:
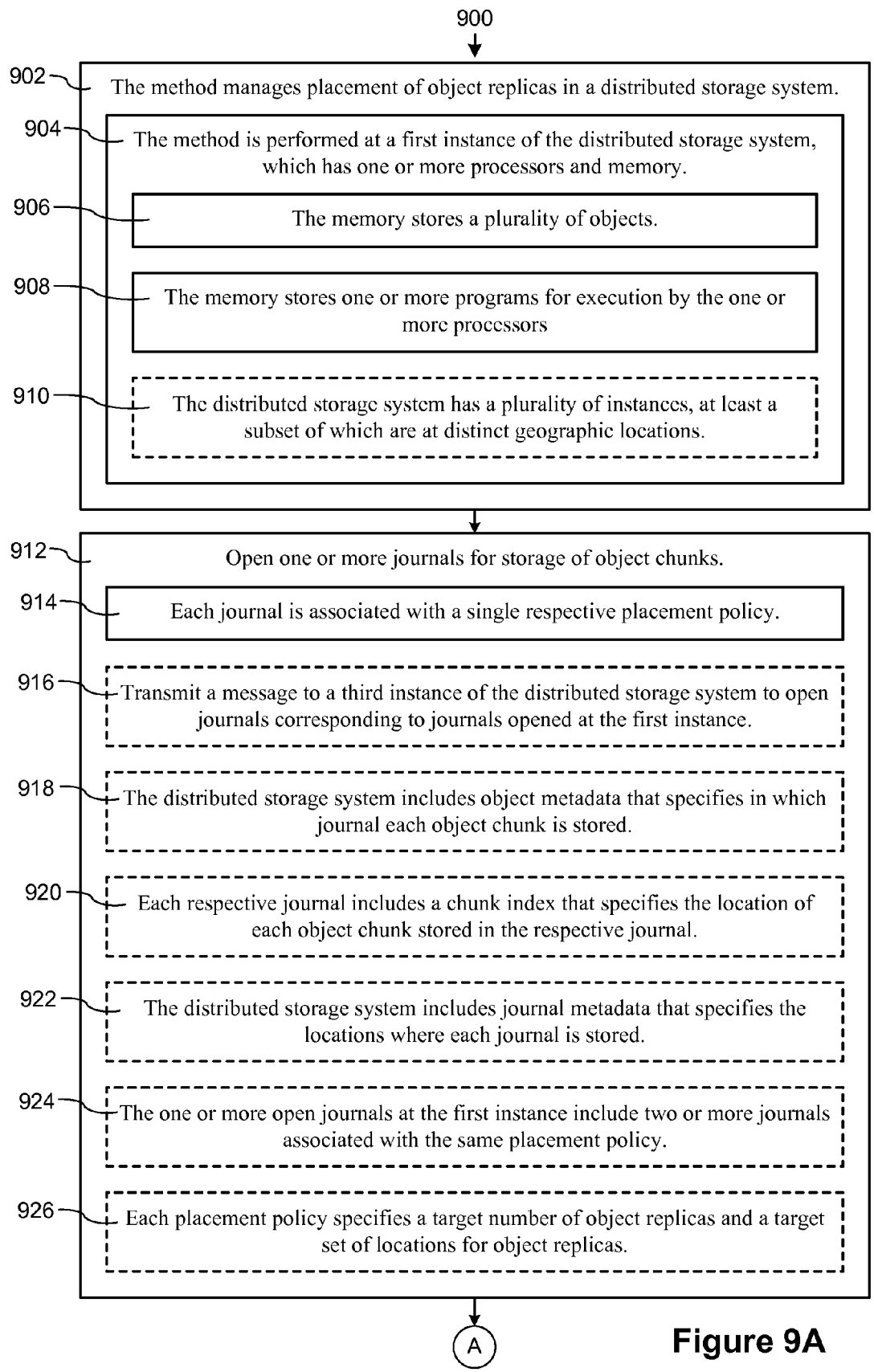
FIGS. 9A-9C illustrate a method of managing placement of object replicas in a distributed storage system according to some implementations.
Figure 9B:
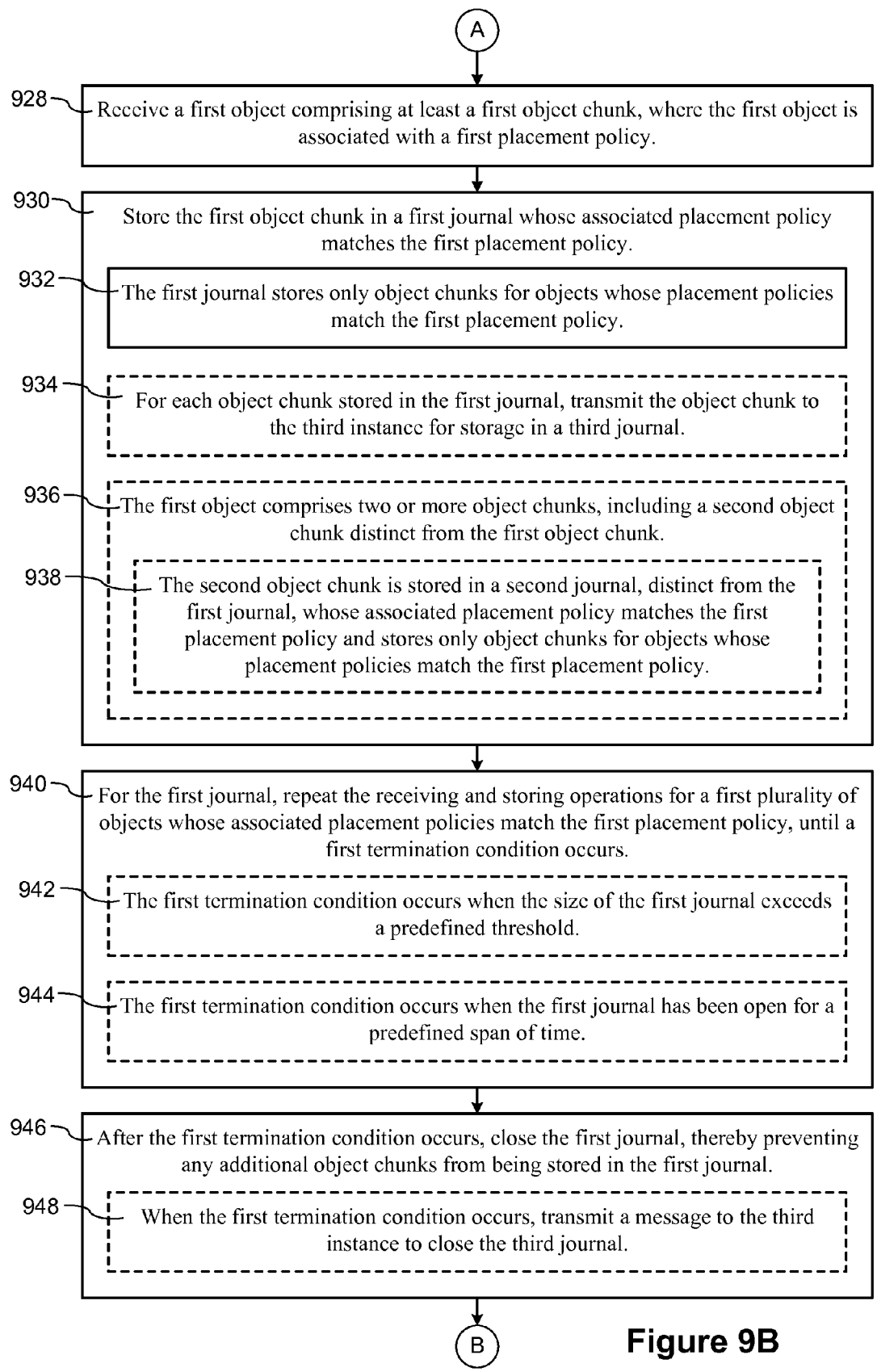
Figure 9C:
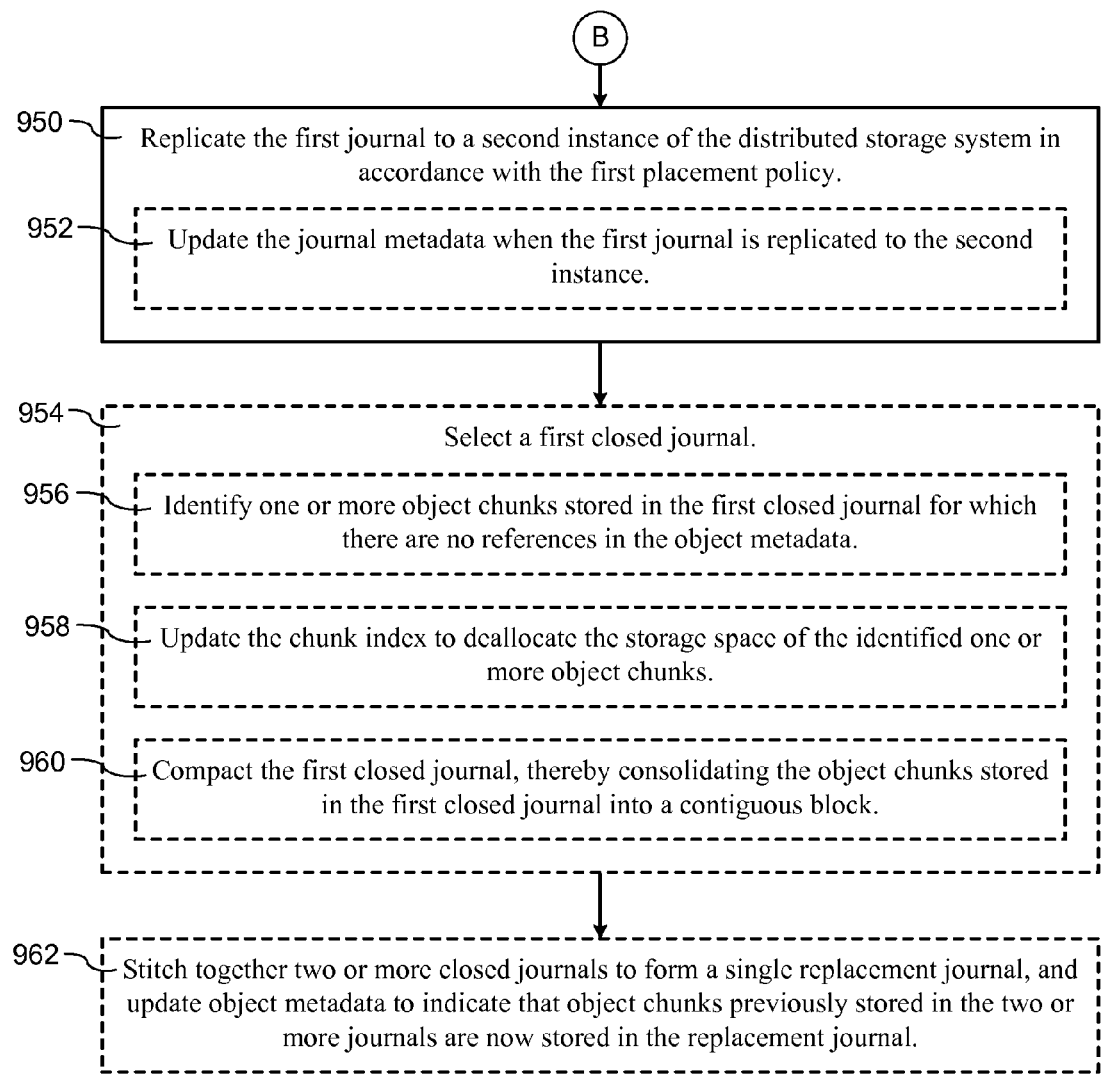

FIGS. 9A-9C illustrate a method 900 of managing (902) placement of object replicas in a distributed storage system 200 according to some implementations. The method is performed (904) at a first instance 102 of the distributed storage system, which has one or more processors and memory. The memory stores (906) a plurality of objects. The memory also stores (908) one or more programs for execution by the one or more processors. In some implementations, all or part of method 900 is performed by location assignment daemon 206. In some implementations, the distributed storage system has (910) a plurality of instances. In some of these implementations, at least a subset of the instances are (910) at distinct geographic locations. In some implementations, each instance corresponds to a data center. In some implementations, each data center comprises one or more instances.

At the first instance, one or more journals 232 are opened (912) for storage of object chunks. Each journal is associated with (914) a single respective placement policy 212. In some implementations, each placement policy specifies (926) a target number of object replicas and a target set of locations for the object replicas. In some implementations, a placement policy 212 may specify what type of data store 224 to use at some of the instances (e.g., on disk or on tape). In some implementations, the distributed storage system 200 includes (918) object metadata 228 that specifies in which journal each object chunk 238 is stored. This was described previously with respect to FIGS. 3-5. In some implementations, each respective journal includes (920) a chunk index 706 that specifies the location of each object stored in the respective journal. This was described in more detail in FIG. 7. In particular, the location of each chunk within a journal is identified relative to the journal itself, and thus the chunk index 706 is accurate regardless of where the journal is stored. For example, by specifying the location of chunks within a journal as offsets, the chunks can be accessed by relative addressing.

Disclosed implementations typically include (922) journal metadata 236 that specifies the locations 372 where each journal is stored. This was described previously in FIGS. 3-5 and 8.

The distribution of open primary journals 232 and open secondary journals 234 depends on many factors, including the available instances 102, the placement policies 212, the anticipated distribution of new objects 226 with the placement policies 212, where the new objects are loaded from (e.g., Europe, North America, Asia), processing resources at each of the available instances 102, and the network bandwidth between the various instances. For example, if many objects will be uploaded with a specific placement policy at a specific instance, then multiple journals are opened (924) for the same placement policy at that instance. In some scenarios, there may be 5, 10, or more open journals for the same placement policy 212 at a single instance 102 when required for load balancing.

As described previously with respect to FIGS. 5 and 6, some implementations transmit (916) a message to a third instance of the distributed storage system 200 to open journals corresponding to journals opened at the first instance. In this scenario, the journals 232 opened at the first instance are referred to as primary journals and the journals 234 opened at the third instance are referred to as secondary journals. (Of course the first instance could also have secondary journals and the third instance could have primary journals.)

At the first instance 102, a first object 226 is received (928), which comprises (928) at least a first object chunk. This was described above with respect to FIG. 6. The first object 226 is associated with a first placement policy 212, and thus all of the object chunks 238 that comprise the object 226 are associated with the first placement policy 212. The first object chunk 238 is stored (930) in a first journal 232 whose associated placement policy matches the first placement policy 212. The first journal 232 stores only (932) object chunks for objects whose placement policies match the first placement policy. In some implementations, each object chunk 238 stored in the first journal 232 is transmitted (934) to the third instance for storage in a third journal 234.

When the received object is larger than the chunk size, the object is split into multiple chunks 238. In this case, the first object 226 comprises (936) two or more object chunks. Typically the second object chunk is distinct from (936) the first object chunk. (Having two identical chunks within a single object is rare, but could happen, for example, if an object had a very large portion of empty space.) In some circumstances, the second object chunk is stored (938) in a second journal 232, distinct from the first journal, whose associated placement policy matches the first placement policy. The second journal stores only (938) object chunks for objects whose placement policies match the first placement policy. In this way, a object that comprises many chunks could have the chunks distributed across many different journals.

This process of receiving objects 226 and storing the chunks 238 in the first journal 232 is repeated (940) for a plurality of objects 226 whose associated placement policies 338 match the first placement policy 212, until a first termination condition occurs. In some implementations, the first termination condition occurs when (942) the size of the first journal exceeds a predefined threshold. In some implementations, the first termination condition occurs when (944) the first journal has been open for a predefined span of time. Some implementations combine size and time in various ways. For example, some implementations specify both a time span and a size limit, and the termination condition is whichever one occurs first.

After the termination condition occurs, the first journal is closed (946), thereby preventing any additional object chunks from being stored in the first journal 232. Generally, implementations confirm that other journals 232 for the same placement policy are still open (or a new one is opened) prior to closing the first journal. Because new objects can arrive at any moment, it is important to have open journals available for storage. When there is a corresponding secondary journal 234 at another instance, the first instance transmits (948) a message to the other instance to close the corresponding secondary journal when the first termination condition occurs.

After the first journal 232 is closed, the journal is subject to its placement policy. Satisfying the placement policy 212 may require moving a journal replica, making a new copy of a journal replica, or deleting a replica of a journal. In some circumstances, the first journal 232 is replicated (950) to a second instance 102 of the distributed storage system 200 in accordance with the placement policy 212. (In other circumstances, a replica of the first journal is deleted.) In implementations that have primary and secondary open journals 232 and 234, there will be two equivalent closed journals 230 once they are closed. Therefore, either of the replicas could be used as the source for the replication 950. As the replication 950 occurs (i.e., as part of the transaction), the journal metadata 236 for the first journal is updated (952) to indicate that there is a copy of the journal at the second instance. This was described above with respect to FIG. 8.

After a journal 230 is closed, the object chunks 238 may be deleted. For example, an object may correspond to an email attachment. If the recipient of the email deletes the email, then the storage for the attachment can be deleted. After a period of time, there are holes within each journal from the deletions, and thus it is useful to compact the journal to remove the wasted space. This is similar to fragmentation of volatile memory and the process of defragmentation to consolidate the unused space into larger contiguous blocks.

Because a stored object chunk may correspond to many distinct objects (e.g., hundreds, thousands, or millions), an object chunk in a journal can only be deleted if there are no more references to it. Therefore, once a first closed journal 230 is selected (954), the process 900 identifies (956) one or more object chunks stored in the first closed journal 230 for which there are no references in the object metadata 228. For these identified chunks 238, the chunk index 706 is updated (958) to remove the corresponding records. In some implementations, the space previously allocated to the identified object chunks are overwritten (e.g., each byte set to ASCII 0), but in other implementations the space is just no longer referenced. In some implementations, the deallocated storage space is tracked as part of the other journal data 708. For example, some implementations maintain a list of deallocated storage spaces (e.g., offset and size), or track the deallocated spaces as a linked list.

In some implementations, a garbage collection algorithm runs periodically to compact (960) each of the closed journals. The compaction process consolidates (960) the stored object chunks into a contiguous block, thus reducing the size of the journal 230. Over time, journals 230 can become small as more object chunks are deleted. Managing many small journals has overhead similar to managing individual objects, and thus the benefit of the journal storage is diminished. To address this issue, some implementations stitch together (962) two or more closed journals to form a single replacement journal, and update (962) object metadata 228 to indicate that object chunks previously stored in the two or more journals are now stored in the replacement journal. Because a stitching operation requires forming an entirely new journal and updating the metadata for all of the objects involved, stitching is usually limited to the scenario where the journals have gotten relatively small.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for managing placement of object replicas in a distributed storage system, comprising:
   at a first instance of the distributed storage system, having one or more processors and memory, wherein the memory stores a plurality of objects and stores one or more programs configured for execution by the one or more processors:
   opening one or more journals for storage of object chunks, wherein:
      each journal is a file associated with a single respective placement policy;
      each journal file includes a journal index that identifies object chunks stored in the journal file; and
      each placement policy specifies a target number of object replicas and a target set of locations for object replicas;
   receiving a first object comprising at least a first object chunk, wherein the first object has a predetermined association with a first placement policy;
   storing the first object chunk in a first journal whose associated placement policy matches the first placement policy, wherein the first journal stores only object chunks for objects whose placement policies match the first placement policy;
   for the first journal, repeating the receiving and storing operations for a first plurality of objects whose associated predetermined placement policies match the first placement policy, until a first termination condition occurs;

when the first termination condition occurs, closing the first journal, thereby preventing any additional object chunks from being stored in the first journal; and replicating the first journal to a second instance of the distributed storage system in accordance with the target number of object replicas and the target set of locations for object replicas of the first placement policy.

2. The method of claim 1, wherein the first object comprises two or more object chunks, including a second object chunk distinct from the first object chunk, and wherein the second object chunk is stored in a second journal, distinct from the first journal, whose associated placement policy matches the first placement policy and stores only object chunks for objects whose placement policies match the first placement policy.

3. The method of claim 1, further comprising:
transmitting a message to a third instance of the distributed storage system to open a replica of the first journal at the third instance;
for each object chunk stored in the first journal, transmitting the object chunk to the third instance for storage in the replica of the first journal at the third instance; and
when the first termination condition occurs, transmitting a message to the third instance to close the replica of the first journal at the third instance.

4. The method of claim 1, wherein the distributed storage system includes object metadata that specifies in which journal each object chunk is stored, and each respective journal replica includes a chunk index that specifies the location of each object chunk stored in the respective journal replica.

5. The method of claim 4, further comprising at the first instance:
selecting a replica of a first closed journal;
identifying one or more object chunks stored in the replica for which there are no references in the object metadata; and
updating the chunk index in the replica to deallocate the storage space of the identified one or more object chunks.

6. The method of claim 5, further comprising compacting the replica, thereby consolidating the object chunks stored in the replica into a contiguous block.

7. The method of claim 1, wherein the first termination condition occurs when the size of the first journal exceeds a predefined threshold.

8. The method of claim 1, wherein the first termination condition occurs when the first journal has been open for a predefined span of time.

9. The method of claim 1, wherein the distributed storage system includes journal metadata that specifies the locations where each journal is stored, the method further comprising updating the journal metadata when the first journal is replicated to the second instance.

10. The method of claim 1, wherein the one or more open journals at the first instance include two or more journals associated with the same placement policy.

11. The method of claim 1, further comprising stitching together two or more closed journals to form a single replacement journal, and updating object metadata to indicate that object chunks previously stored in the two or more journals are now stored in the replacement journal.

12. The method of claim 1, wherein the distributed storage system has a plurality of instances.

13. The method of claim 12, wherein at least a subset of the instances are at distinct geographic locations.

14. A computer system for managing placement of object replicas in a distributed storage system having a plurality of instances, each respective instance comprising:
one or more processors;
memory; and
one or more programs stored in the memory, the one or more programs comprising instructions executable by the one or more processors for:
opening one or more journals for storage of object chunks, wherein:
each journal is a file stored in the memory and is associated with a single respective placement policy;
each journal file includes a journal index that identifies object chunks stored in the journal file; and
each placement policy specifies a target number of object replicas and a target set of locations for object replicas;
receiving a first object comprising at least a first object chunk, wherein the first object has a predetermined association with a first placement policy;
storing the first object chunk in a first journal whose associated placement policy matches the first placement policy, wherein the first journal stores only object chunks for objects whose placement policies match the first placement policy;
for the first journal, repeating the receiving and storing operations for a first plurality of objects whose associated predetermined placement policies match the first placement policy, until a first termination condition occurs;
when the first termination condition occurs, closing the first journal, thereby preventing any additional object chunks from being stored in the first journal; and
replicating the first journal to a second instance of the distributed storage system, distinct from the respective instance, in accordance with the target number of object replicas and the target set of locations for object replicas of the first placement policy.

15. The computer system of claim 14, wherein the first object comprises two or more object chunks, including a second object chunk distinct from the first object chunk, and wherein the second object chunk is stored in a second journal, distinct from the first journal, whose associated placement policy matches the first placement policy and stores only object chunks for objects whose placement policies match the first placement policy.

16. The computer system of claim 14, wherein the distributed storage system includes object metadata that specifies in which journal each object chunk is stored, and each respective journal replica includes a chunk index that specifies the location of each object chunk stored in the respective journal replica.

17. The computer system of claim 16, wherein the one or more programs further comprise instructions for:
selecting a replica of a first closed journal;
identifying one or more object chunks stored in the replica for which there are no references in the object metadata; and
updating the chunk index in the replica to deallocate the storage space of the identified one or more object chunks.

18. The computer system of claim 17, wherein the one or more programs further comprise instructions for compacting the replica, thereby consolidating the object chunks stored in the replica into a contiguous block.

19. A non-transitory computer readable storage medium storing one or more programs configured for execution by one or more processors of a computer system to manage placement of object replicas in a distributed storage system having a plurality of instances, the one or more programs at each respective instance comprising instructions for:
  opening one or more journals for storage of object chunks, wherein:
    each journal is a file stored in the memory and is associated with a single respective placement policy;
    each journal file includes a journal index that identifies object chunks stored in the journal file; and
    each placement policy specifies a target number of object replicas and a target set of locations for object replicas;
  receiving a first object comprising at least a first object chunk, wherein the first object has a predetermined association with a first placement policy;
  storing the first object chunk in a first journal whose associated placement policy matches the first placement policy, wherein the first journal stores only object chunks for objects whose placement policies match the first placement policy;
  for the first journal, repeating the receiving and storing operations for a first plurality of objects whose associated predetermined placement policies match the first placement policy, until a first termination condition occurs;
  when the first termination condition occurs, closing the first journal, thereby preventing any additional object chunks from being stored in the first journal; and
  replicating the first journal to a second instance of the distributed storage system, distinct from the respective instance, in accordance with the target number of object replicas and the target set of locations for object replicas of the first placement policy.

* * * * *